United States Patent [19]
Hoy et al.

[11] 3,776,397
[45] Dec. 4, 1973

[54] ARMATURE WINDING APPARATUS WITH IMPROVED ARMATURE LOADING MECHANISM

[75] Inventors: Robert P. Hoy, Springfield; Robert C. Gray, Dayton, both of Ohio

[73] Assignee: Mechaneer, Inc., Dayton, Ohio

[22] Filed: Feb. 28, 1972

[21] Appl. No.: 229,667

[52] U.S. Cl. .......................... 214/8.5 K, 214/1 BB
[51] Int. Cl. ............................................ B65g 61/00
[58] Field of Search .................. 214/1 BB, 1.1, 1.3, 214/1.4, 8.5 K

[56] References Cited
UNITED STATES PATENTS
2,947,427   8/1960   Moore .............................. 214/1 BB
1,836,444   12/1931  Carnahan .......................... 214/1 BB Primary Examiner—Robert B. Reeves
Assistant Examiner—Larry Martin
Attorney—William R. Jacox et al.

[57] ABSTRACT

A series of armatures each including an armature core and a commutator mounted on a shaft, are automatically and successively loaded into an armature winding machine between a pair of opposingly retractable wire forming chucks by a vertically disposed carriage supported for linear movement between an upper receiving position and a lower delivery position. The carriage incorporates means for releasably gripping an end portion of the shaft and cooperates with a linearly movable transfer shelf to transfer each armature from a supply ramp downwardly between the chucks after they have moved to their retracted open positions. Adjustable stops provide for accommodating armatures of different sizes.

10 Claims, 3 Drawing Figures

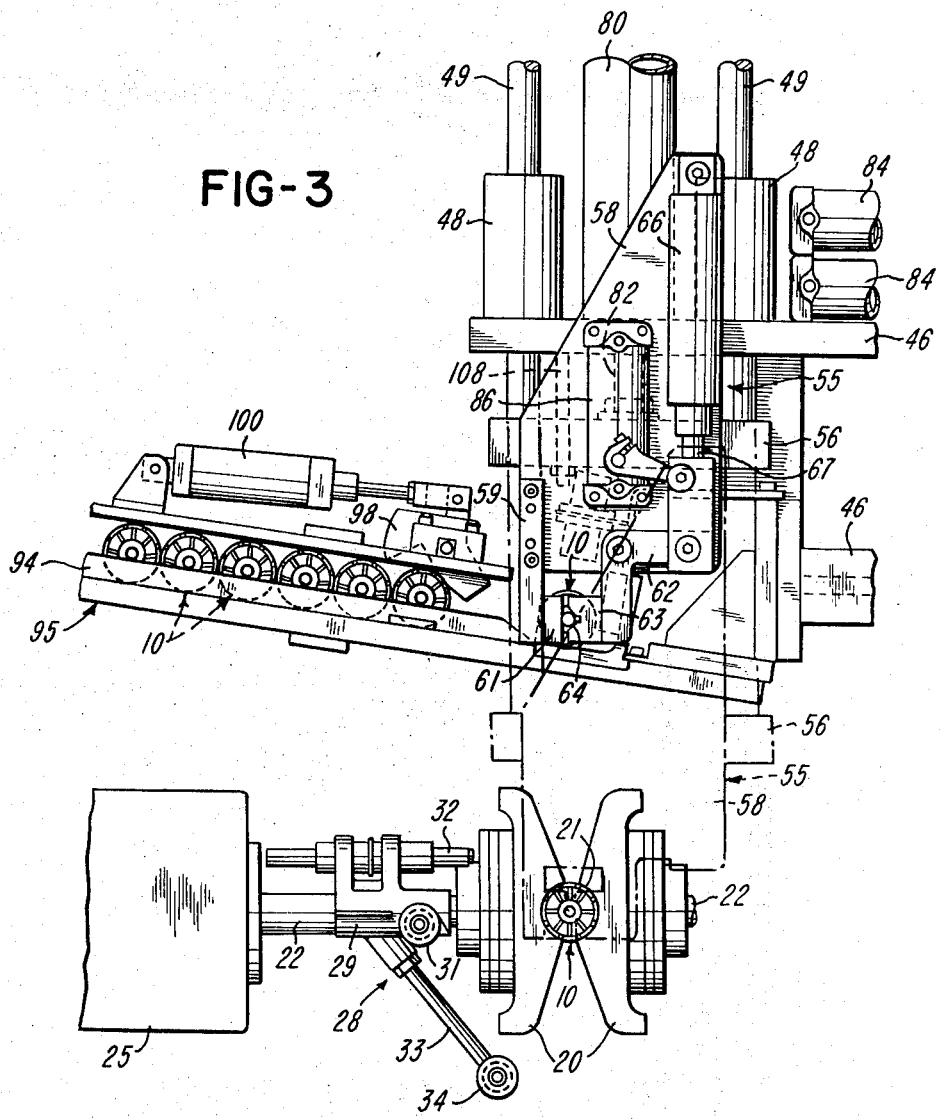

ARMATURE WINDING APPARATUS WITH IMPROVED ARMATURE LOADING MECHANISM

BACKGROUND OF THE INVENTION

In the manufacture of an armature which includes a slotted armature core and a commutator mounted on a shaft, it is common to use a winding machine of the general type disclosed in U.S. Pat. No. 2,627,379 and No. 3,013,737 for winding coils of wire on the armature core and for connecting the coils to corresponding segments of the commutator. Such machines incorporate a pair of opposing wire forming heads or chucks which are movable linearly between retract open positions and extended closed positions for engaging the outer surface of an armature core. The coils of wire are wound onto the armature core by rotary flyers positioned adjacent the chucks, and wire leads are extended from each coil for connection with a corresponding segment of the commutator.

There have been different types of mechanisms either used or proposed for successively transferring or loading a plurality of unwound armatures from a suppy of armatures to a winding position or station located between the opposing core support chucks. For example, unwound armatures have been loaded into the support chucks by an arm which grips the armature shaft and then moves the armature laterally to a position spaced axially of the chucks, after which the arm moves the armature axially to its winding position between the chucks. Armatures have also been loaded by a pivotal arm which grips each armature and then swings the armature between the support chucks to the winding station where the armature core is gripped by the chucks as they are moved to their extended or closed positions.

It has been found that these armature loading devices are not only complex and expensive in construction, but usually require substantial space adjacent the winding heads for movement of the mechanism, thereby requiring substantial axial movement of the commutator shield assembly of the winding machine and/or the mechanism which unloads each armature after it is wound. Furthermore, the previous mechanisms do not always position each armature precisely relative to the forming chucks and do not conveniently accommodate armatures of different sizes, thus significantly increasing the down time of the winding machine when it is being modified for winding a different size armature.

SUMMARY OF THE INVENTION

The present invention is directed to an armature winding machine incorporating an improved mechanism for automatically and successively loading unwound armatures into the machine between a pair of opposing wire forming chucks and which also provides for rapid, efficient operation and for precisely positioning each armature between the forming chucks without requiring substantial space laterally adjacent the chucks. The loading mechanism of the invention is also of simplified and economical construction, provides for dependable operation and may be conveniently adjusted for accommodating armatures of different sizes.

In accordance with a preferred embodiment of the invention, a vertically disposed carriage is supported for linear movement in a vertical direction directly above the forming chucks and includes jaws for releasably gripping an end portion of each armature shaft after the armature is transferred from a supply source by a linear moving transfer shelf. The forming chucks are retracted, and the carriage moves downwardly to deliver the armature to a precise winding position between the chucks. The chucks are then extended or closed to support the armature core, after which the armature shaft is released, and the carriage is retracted upwardly to its home position ready to receive the shaft of the next successive armature. The home position of the transfer carriage is conveniently adjustable for receiving armatures of different sizes.

Other features and advantages of the invention will be apparent from the following description, the accompanying drawings and the appended claims.

BRIEF DESCRIPTION OF THE DRAWINGS

FIG. 3 is a fragmentary front elevational view of the winding apparatus and armature loading mechanism shown in FIG. 1 and illustrating by dotted lines the movement of the armature loading carriage.

DESCRIPTION OF THE PREFERRED EMBODIMENT

Figure 1:
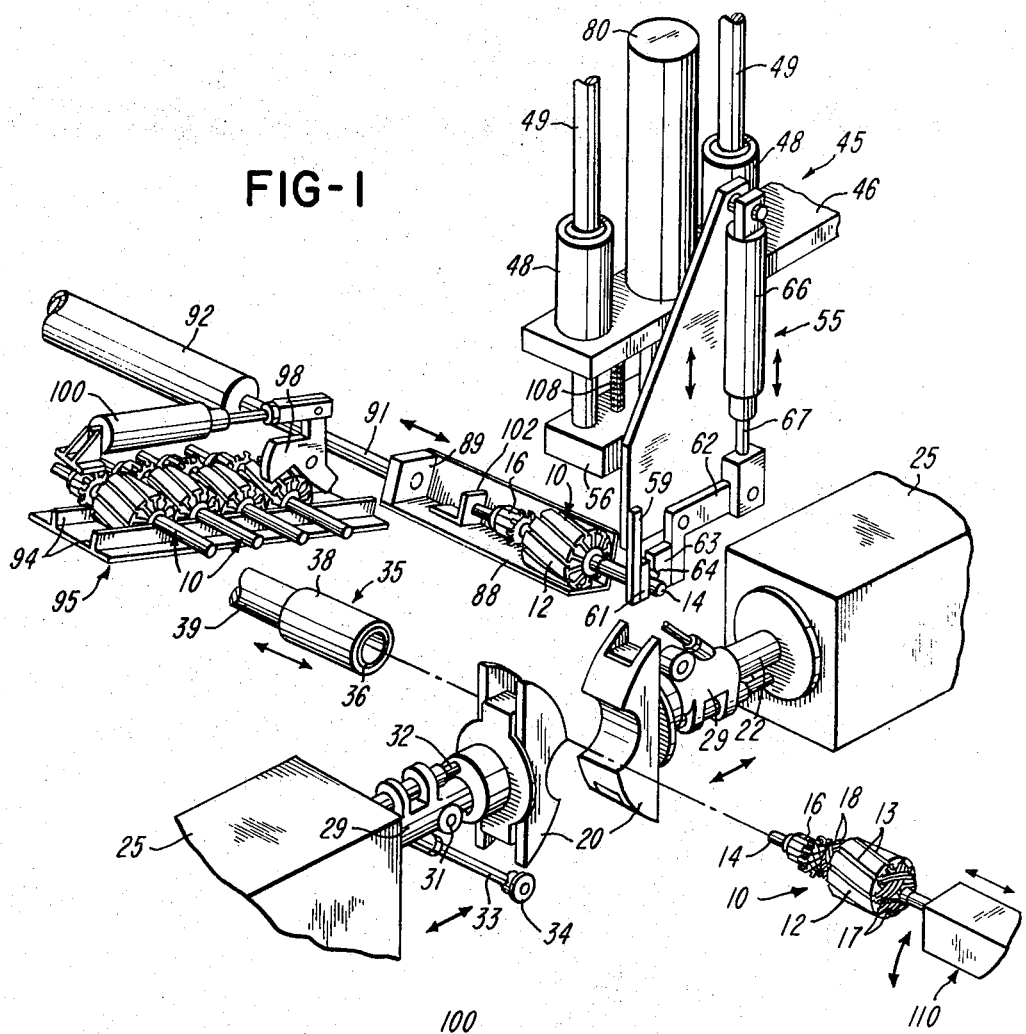
FIG. 1 is somewhat diagrammatic perspective view of armature winding apparatus incorporating an armature loading mechanism constructed in accordance with the invention.

Each of the armatures 10 shown in FIG. 1 includes a laminated armature core 12 having slots 13 and mounted on a shaft 14 which also supports a commutator 16. Wire coils 17 are wound within the slots 13 of the core 12 and include leads 18 which are connected to tangs projecting from corresponding segments of the commutator 16. The winding of the wire coils 17 is performed while the armature core 12 is retained by a pair of opposing wire forming chucks 20 each having a semicylindrical cavity 21 conforming to the curvature of the armature core 12. Each of the chucks 20 is supported by an antifriction bearing (not shown) mounted on the outer end portion of a corresponding hollow spindle 22, and each of the spindles 22 is supported for rotary and axial movement by a corresponding housing portion 25. Each spindle 22 is moved axially by a lever activated by a fluid cylinder, and the spindles are driven by a reversible hydrostatic drive (not shown) enclosed within the housing.

A flyer assembly 28 is rigidly secured to each of the spindles 22 for rotation therewith, and includes a hub portion 29 which supports a wire guide roller or pulley 31 and a telescopic spring-bias brake rod assembly 32. A flyer arm 33 projects outwardly from each of the hub members 29 and supports another wire guide roller or pulley 34. During the winding of each armature 10 while it is supported by the chucks 20 as illustrated in FIG. 3, the flyer assemblies 28 and the corresponding spindles 22 rotate in opposite directions. Also during the winding operation, the commutator 16 of the armature is confined within a shield assembly 35 including a cylindrical inner sleeve 36 surrounded by an outer cylindrical sleeve 38 secured to a tubular rod 39.

The shield assembly 35 is supported for axial movement after an armature is received between the forming chucks 20 so that the commutator 16 and the corresponding end portion of the shaft 14 are received within the shield assembly 35. After the winding of each wire coil 17, the outer sleeve 38 is retracted relative to the inner sleeve 36, and the armature is indexed to provide for connecting a coil lead 18 to the corresponding tang projecting outwardly from a segment of the commutator 16.

In accordance with the present invention, each of the armature cores 10 is transferred or loaded into the wire forming chucks 20 by a loading mechanism 45 which is positioned above the chucks 20 and the corresponding support housing portions 25. The loading mechanism 45 includes a frame member 46 which is rigidly secured to the underlying housing portion 25 and supports a pair of vertically extending antifriction ball-type cylindrical bearings 48 which receive corresponding guide rods 49 for low friction axial movement.

A carriage 55 includes a bar 56 which is rigidly secured to the lower end portions of the guide rods 49 and supports a vertical carriage plate 58. The carriage plate 58 supports a downwardly depending bracket 59 on which is mounted a block-like stationary jaw 61. A lever 62 is pivotally supported by the plate 58 and carries a movable jaw 63 having a V-shaped notch 64 which cooperates with the flat vertical surface of the jaw 61 to grip the forward end portion of each armature shaft 14 as shown in FIG. 1. The jaw 63 moves between clamped and releasing positions in response to actuation of an air cylinder 66 pvotally connected to the carriage plate 58 and having a connecting rod 67 pivotally connected to the lever 62.

The carriage 55 is movable between an upper retracted position (FIG. 1) and a lower extended position, illustrated by the dotted line in FIG. 3, in response to actuation of an air cylinder 80 which is mounted on the frame member 46 and has a downwardly extending piston rod 82 (FIG. 3) connected to the carriage bar 56. The cylinder 80 is controlled by a set of limit switches 84 (FIG. 3) which sense the vertical movement of the carriage 55. Another limit switch 86 is mounted on the carriage support plate 58 and controls the actuation of the air cylinder 66.

Figure 2:
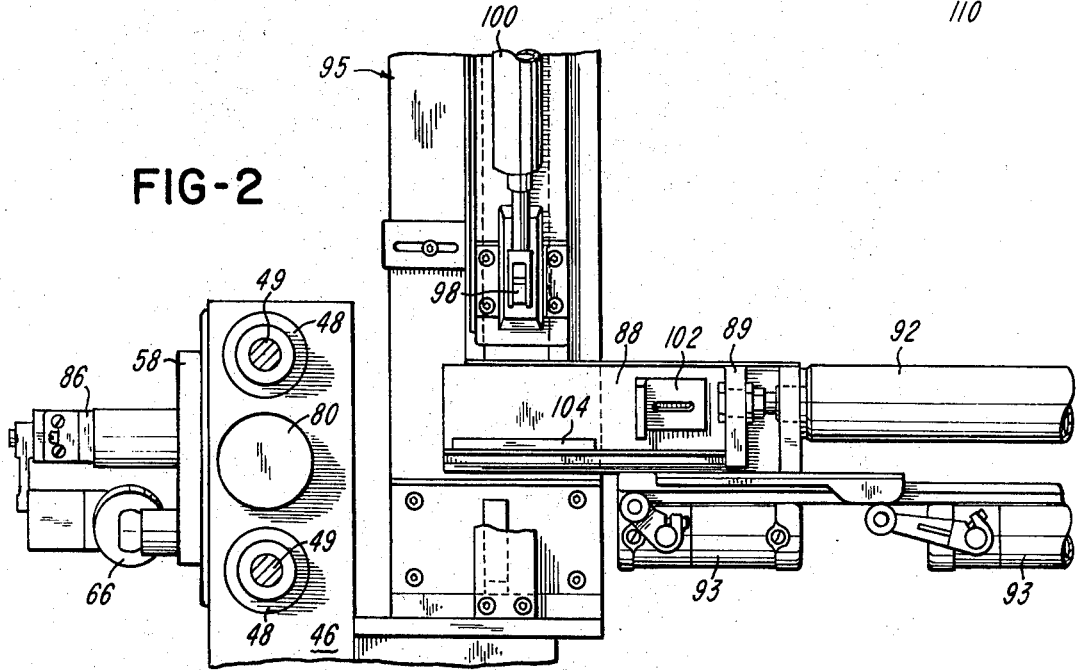
FIG. 2 is a fragmentary planned view of the armature loading mechanism shown in FIG. 1.

As shown in FIGS. 1 and 2, each armature 10 is transferred to the loading carriage 55 by an angular shaped elongated transfer shelf 88 which projects from a support block 89. The block 89 is mounted on the forward end portion of a piston rod 91 extending from a horizontally disposed air cylinder 92 controlled by a set of limit switches 93. The transfer shelf 88 moves between an extended position (FIG. 1) and a retracted position (FIG. 2) where it is positioned to receive the lowermost armature from a stack or supply of armatures supported by a pair of parallel spaced tracks or rails 94 of an incline support ramp 95. The ramp 95 is supported by a frame member (not shown) which is rigidly secured to the underlying housing portion 25. The armatures 10 are successively released from the bottom of the support ramp 95 by a pivotal escapement dog or lever 98 which is actuated in response to operation of a double acting air cylinder 100.

The sequence or cycle of operation of the armature loading mechanism 45 is timed with the movement of the forming chucks 20 and the flyer assemblies 28. The armature loading operation commences with the retraction of the air cylinder 100 causing the lowermost armature 10 on the ramp 95 to roll onto the transfer shelf 88 located in its retracted position. As shown in FIG. 2, an angular stop bracket 102 is adjustably mounted on the transfer shelf 88 and is adapted to engage the adjacent or inner end of the armature shaft 14.

A magnetic spacer block 104 (FIG. 2) is attached to the transfer shelf 88 and attracts the armature core 12 so that the armature 10 is firmly seated on the transfer shelf 88 with the axis of the armature shaft 14 aligned precisely with the axis of the piston rod 91 of the air cylinder 92. The magnetic spacer block 104 is interchangeable with other spacer blocks of different thicknesses according to the diameter of the armature core 12 to be wound.

After an armature 10 is received and seated on the transfer shelf 88, the air cyliner 100 is actuated to extend the transfer shelf 88 and to carry the armature 10 to the position shown in FIG. 1 where the forward end portion of the armature shaft 14 projects between the gripping jaws 61 and 63 when the latter jaw is retracted to its open position. An adjustae stop screw 108 (FIG. 1) extends through a threaded hole within the carriage bar 56 and engages the underneath surface of the frame member 46 to provide for precisely positioning the carriage 55 so that the notch 64 within the jaw 63 precisely aligns with the armature shaft 14 when the carriage 55 is in its retracted upper position.

After the forward end portion of the armature shaft 14 is extended between the jaws 61 and 63, the air cylinder 66 is actuated to close the jaw 63 so that the armature 10 is firmly gripped by the carriage 55. The transfer shelf 88 is retracted, and after the chucks 20 are retracted in their open positions as shown in FIG. 1, the air cylinder 80 is actuated to extend the piston rod 82 and to lower the carriage 55. Thus the armature 10 supported by the carriage 55, is lowered downwardly between the open chucks 20 to a position where the axis of the armature shaft 14 is precisely aligned with the axis of the commutator shield assembly 35. The forming chucks 20 are then extended or closed so that the armature core 12 is retained within the opposing semicylindrical cavities 21 as illustrated in FIG. 3. The shield assembly 35 is extended to receive the commutator 16 and the corresponding end portion of the armature shaft 14. The jaw 63 is retracted by actuation of the cylinder 66 and the air cylinder 80 is actuated to move the carriage 55 back to its upper home position.

The winding operation then commences, and each wire coil 17 is wound and attached to the commutator 16. After the armature is completely wound, the head portion 110 of an unloader mechanism (not shown) is extended axially to a position where its clamping jaws grip the projecting end portion of the armature shaft 14. The chucks are opened, and the head portion 110 is retracted to withdraw the wound armature axially from between the forming chucks 20, after which the head member 110 rotates approximately 90° on a vertical axis to deliver the wound armature to a mechanism (not shown) for staking or otherwise rigidly securing the wire leads 18 to the corresponding segments of the commutator 16.

The above described sequence or cycle of operation is performed entirely automatically with some of the operations being performed simultaneously. That is, an unwound armature 10 is transferred by the shelf 88 to the carriage 55 while the preceding armature is being wound in the winding position between the forming chucks 20. When a wound armature is being retracted from the forming chucks 20 by the head member 110 of the unloading mechanism, an unwound armature 10 is simultaneously loaded into the winding position by downward movement of the carriage 55.

From the drawings and the above description, it is apparent that an armature winding apparatus incorporating an armature loading mechanism constructed in accordance with the present invention, provides desirable features and advantages. For example, the arrangement and linear movement of the carriage 55 between its upper and lower positions, provide for quickly and smoothly loading an unwound armature into the winding machine between the forming chucks 20 after the chucks 20 are retracted by a distance sufficient to provide for passing the armature core 12 directly downwardly between the chucks. Furthermore, the carriage 55 provides for precisely positioning each armature concentrically between the forming chucks and is particularly adapted for conveniently accommodating armatures of different sizes. In addition, the loading carriage 55 does not require any space beyond the armature shaft 14 during the loading operation and thereby minimizes the axial movement required by both of the shield assembly 35 and the head member 110 during unloading of the armatures after they are wound. Moreover, the entire armature loading mechanism is simple and economical in construction and is dependable in operation.

While the form of apparatus herein described constitutes a preferred embodiment of the invention, it is to be understood that the invention is not limited to the precise form of apparatus described, and that changes may be made therein without departing from the scope and spirit of the invention as defined in the appended claims.

We claim:

1. Apparatus for winding coils of wire on an armature including an armature core mounted on a shaft having one end portion supporting a commutator, said apparatus comprising a pair of horizontally opposed chuck members, means supporting said chuck members for opposing horizontal linear movement between closed positions for engaging an armature core at a winding station and open positions spaced to provide for vertical movement of an armature core between said chuck members, shield means supported for horizontal linear movement in a direction normal to the direction of movement of said chuck members for receiving said commutator and said one end portion of said armature shaft, means for supporting a supply of unwound armatures, a carriage having means for releasably gripping the opposite end portion of said armature shaft, means supporting said carriage for vertical linear movement between an upper position and a lower position, means for transferring each armature from said means for supporting a supply of armatures to said carriage in said upper position, and means for moving said carriage from said upper position to said lower position to transfer each armature downwardly between said chuck members in their open positions.

2. Apparatus as defined in claim 1 including means for adjusting the elevation of said carriage in said upper position for receiving and accommodating armatures of different sizes.

3. Apparatus as defined in claim 1 wherein said carriage supporting means include a plurality of vertical guide rods, and bearing members receiving said guide rods.

4. Apparatus as defined in claim 3 wherein said means for moving said carriage include a fluid cylinder positioned between two of said guide rods.

5. Apparatus as defined in claim 1 wherein said means for supporting a plurality of armatures include an inclined support ramp, and including escapement means for successively releasing the armatures from the bottom of said support ramp for transfer to said shaft gripping means of said carriage.

6. Apparatus for winding coils of wire on an armature including an armature core mounted on a shaft having one end portion supporting a commutator, said apparatus comprising a pair of horizontally opposed chuck members, means supporting said chuck member for opposing horizontal linear movement between closed positions for engaging an armature core and open positions spaced to provide for vertical movement of an armature core between said chuck members, shield means supported for horizontal linear movement in a direction normal to the direction of movement of said chuck members for receiving said commutator and said one end portion of said armature shaft, means for supporting a supply of unwound armatures, a carriage having means for releasably gripping the opposite end portion of said armature shaft, vertical guide means supporting said carriage for vertical linear movement between an upper position and a lower position, fluid cylinder actuated means for transferring each armature axially from the supply to said gripping means when said carriage is in said upper position, and power operated means for moving said carriage between said upper and lower positions for transferring each armature received by said gripping means downwardly between said chuck members in their open positions.

7. Apparatus as defined in claim 6 including an armature transfer member adapted to receive each armature from said means for supporting a supply of armatures, means for moving said transfer member to effect movement of each armature axially to present said opposite end portion of said shaft to said gripping means of said carriage, and means for adjusting the position of each armature on said transfer member to align the axis of said shaft with said gripping means.

8. Apparatus as defined in claim 6 wherein said carriage includes a vertically disposed plate, said gripping means include a set of jaws depending downwardly from said plate, and means mounted on said plate for moving one of said jaws.

9. Apparatus as defined in claim 8 wherein said carriage plate and said jaws extend laterally adjacent said chuck members when said carriage is moved to said lower position.

10. In apparatus for winding coils of wire on an armature including an armature core mounted on a shaft having one end portion supporting a commutator, said apparatus including a pair of opposing chuck members supported for opposing linear movement between closed positions for engaging an armature core and open positions spaced to provide for lateral movement of an armature between said chuck members, and shield means supported for linear movement in a direction normal to the direction of movement of said chuck members for receiving said commutator and said one end portion of said armature shaft, an improved mechanism for successively loading armatures into said chuck members, comprising means for supporting a supply of unwound armatures, a carriage having movable jaw means for releasably gripping the opposite end portion of said armature shaft, a plurality of parallel spaced vertical guide rods supporting said carriage for linear movement between an upper position and a lower position, a transfer member positioned to move each armature axially from the supply of armatures to said carriage in said upper position, and means for moving said carriage from said upper position to said lower position to transfer each armature downwardly between the said chuck members in their open positions to a winding station.

* * * * *